Nov. 6, 1923.
R. C. DUGAN
1,472,965
WAGON HITCH
Filed March 3, 1922
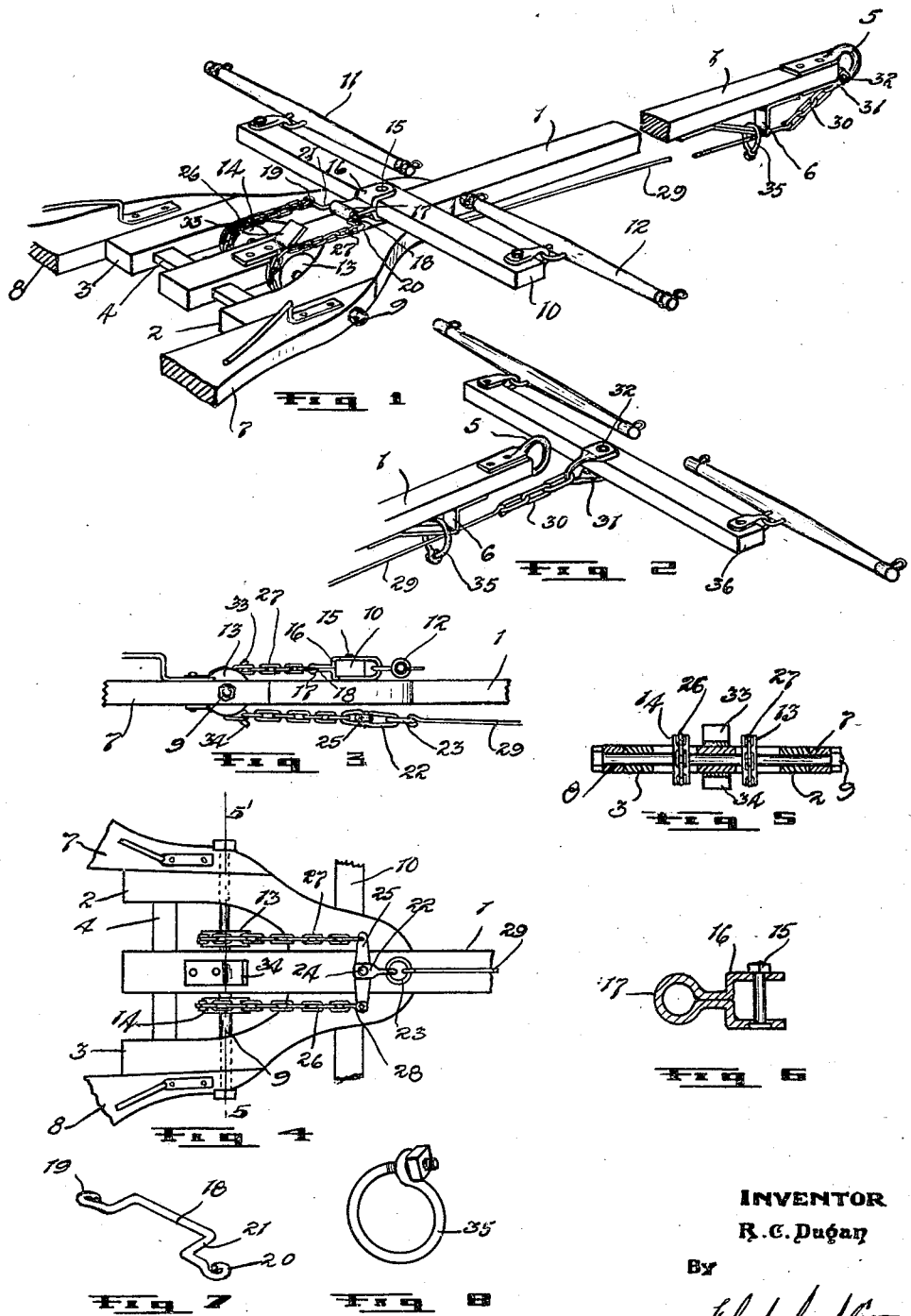
INVENTOR
R. C. Dugan
By
Schuster...
ATTYS Patented Nov. 6, 1923.

1,472,965

UNITED STATES PATENT OFFICE.

ROBERT CLEMENT DUGAN, OF MILDEN, SASKATCHEWAN, CANADA.

WAGON HITCH.

Application filed March 3, 1922. Serial No. 540,854.

*To all whom it may concern:*

Be it known that I, ROBERT CLEMENT DUGAN, of the town of Milden, in the Province of Saskatchewan, Canada, have invented certain new and useful Improvements in Wagon Hitches, of which the following is the specification.

The invention relates to improvements in wagon hitches and an object of the invention is to provide a hitch for a wagon which can be utilized either for one team or two teams in tandem, as occasion may require, and which is arranged so that the driver can quickly set the hitch to suit the draft required.

A further object of the invention is to construct the appliance such that when two teams are hitched thereto the appliance acts as an evener so that the load will be evenly distributed between the teams.

A still further object of the invention is to construct the appliance such that it can be readily attached to existing wagons without requiring to modify the wagons in any way.

A still further object is to construct the appliance in a simple and durable manner and such that a farmer or such person can equip his wagon with the device quickly and at small expense.

With the above more important objects in view the invention consists essentially in the arrangement and construction of parts hereinafter more particularly described and later pointed out in the appended claims, reference being had to the accompanying drawing in which:

Fig. 1 is a perspective view of the hitch as it appears when arranged for a single team, the central pole of the ball having been broken away.

Fig. 2 is a perspective view of the forward end of the pole and parts associated therewith, as it appears when arranged for two teams in tandem.

Fig. 3 is a side view of the rear part of the hitch.

Fig. 4 is an inverted plan view of the rear part of the hitch.

Fig. 5 is a vertical cross sectional view, the section being taken in the plane denoted by the line 5—5′ Fig. 4.

Fig. 6 is an enlarged detailed sectional view through the top clevis.

Fig. 7 is a perspective view of the cross rod 18.

Fig. 8 is a perspective view of the ring.

In the drawing like characters of reference indicate corresponding parts in the several figures.

The customary pole or tongue 1 of the wagon is provided at the rear end with the usual pole hounds 2 and 3, the rear ends of which are braced by the pole bar 4. The forward end of the pole is fitted with a pole cap which provides a loop 5 at the forward end of the pole and adjoining the forward end and at the underside the pole is fitted with the customary knee plate 6 forming a stop for the neck yoke ring (not shown).

The pole hounds are received between the front hounds 7 and 8 of the wagon and the queen bolt 9 pivotally connects the front hounds 7 and 8 to the rear end of the pole, the bolt passing through the hounds 2 and 3 and the pole 1.

The rear double tree 10 is of the usual form and is provided with the customary single trees 11 and 12 to which the rear team of draft animals is hitched.

All the above parts are of ordinary construction and form no part of my invention.

In equipping a wagon with my invention I place two guide rollers 13 and 14 on the queen bolt 9, these being put in place between the pole and the pole hounds by withdrawing the usual queen bolt and then resetting it and passing it through the rollers.

Centrally to the double tree I connect pivotally by the bolt 15 a top clevis 16 which is fitted rearwardly with an eye 17 carrying a cross rod 18 of predetermined length and having eyes 19 and 20 formed at the ends thereof. The rod is offset as indicated at 21 to prevent end shifting of the same in the eye 17.

In a location underneath the pole and more or less directly opposing the clevis 16 I locate a second similar under clevis 22, similar to that 16, the said clevis being fitted with a ring 23 and being connected by a removable bolt 24 to a short rocker bar 25. The ends of the rocker bar are connected to the eyes 19 and 20 by flexible connections, such as chains 26 and 27, the chains passing around the rear sides of the pulleys and being of a predetermined length.

The end of one of the chains is fitted with a clevis 28 attaching it to the end of the bar 25. By this arrangement it is possible, by detaching the chain at the clevis 28, to put the two chains in proper position in respect to the pulleys and whilst retaining a permanent connection at the other points between the chains, rod 18 and bar 25.

To the ring 23 I connect a forwardly extending draft rod 29, the forward end of which carries a short length of chain 30. A clevis 31 is carried by the chain and when the device is utilized as a hitch for a single team the clevis is fastened by the bolt 32 to the pole cap, the bolt passing through the loop 5 at the end of the pole. The clevis 31 can be entered in one or other of the links of the chain so that an adjustment can be made at this point.

To the rear end of the pole I attach a pair of striker or stop plates 33 and 34, these plates being adapted to strike and catch the back going eye 17 or the back going bar 25, in the manner as later described. These stop plates are designed so that they stop the said parts in a location adjoining the pulleys and they are arranged such that they can be attached to the pole by the same bolts as are at present employed to fasten the customary gooseneck to the pole.

The stop or knee plate 6 carries a ring 35. This ring is made as best shown in Fig. 8 so that it can be fitted to the knee plate without having to remove the same. The rod 29 passes through the attached ring.

When the hitch is utilized with a single team it is set as best shown in Fig. 1 and here it is to be observed that the draft animals are anchored, so to speak, through the chains and draft rod 29 to the front end of the pole.

When the hitch is utilized with two teams, as when pulling a heavy load or when mired, a second double tree 36 is provided to which the second team is hitched. The bolt 32 is then detached from the loop 5 of the pole and the clevis 31 is then connected by the bolt 32 to the front double tree 36. The load is then pulled by the two teams, the appliance also acting as an equalizer as the one team pulls directly against the other through the rod 29 and the chains 26 and 27.

When drawing in tandem in this way the stop 33 limits the forward position of the front double tree by stopping the rear double tree in its backward movement and the stop 34 limits the forward movement of the rear double tree by engagement with the bar 25.

Ample working room is given to the teams in the length of chain provided; so that a reasonably careful driver can make the teams pull the load evenly.

I wish particular attention to be paid the feature that I require no alteration to be made in the present wagon equipment when one desires to equip his wagon with my hitch and further that when it is equipped to work with a single team in the usual way it is so arranged that two teams can be immediately attached by simply undoing the bolt 32 and connecting the front clevis 31 to the double tree of the second team.

What I claim as my invention is:

1. The combination with a wagon pole and a double tree of a pair of pulleys carried by the rear part of the pole, a clevis connected to the double tree, a rod secured in the clevis to extend transversely of the pole, a pair of parallel flexible connections attached to the ends of the rod and passing rearwardly around the pulleys and then forwardly at the underside of the tongue, a bar connecting the ends of the chains and maintaining the same in parallel relation, a draft rod passing forwardly from an intermediate portion of the bar and located underneath the tongue and a clevis attached to the forward end of the bar and adapted to be anchored to the tongue or to a forwardly positioned double tree.

2. The combination with the structure recited in claim 1 of a stop member secured to the upper surface of the pole to limit the rearward movement of the first mentioned double-tree and a second stop member secured to the lower surface of the pole to limit the rearward movement of the bar connecting the ends of the chains.

3. The combination with claim 1 of a pair of stop members secured respectively to the upper surfaces of the pole by common fastening means and positioned rearwardly of the first-mentioned double-tree and the bar connecting the ends of the said chains.

4. The combination of a wagon pole provided with the usual knee plate, a doubletree supported above the pole and movable longitudinally thereof, guide means at the rear end of the pole, a draft connection passing rearwardly from the double-tree to the guide means thence forwardly from the guide means to the forward end of the pole at which point the draft connection is anchored and a guide device encircling the draft connection and knee plate comprising a divided ring having one end formed into an eye receiving the other end therethrough and means for holding the said ends against separation.

Signed at Winnipeg this 18th day of January 1922.

ROBERT CLEMENT DUGAN.

In the presence of:
GERALD S. ROXBURGH,
M. B. KELLEHER.